_United States Patent Office_

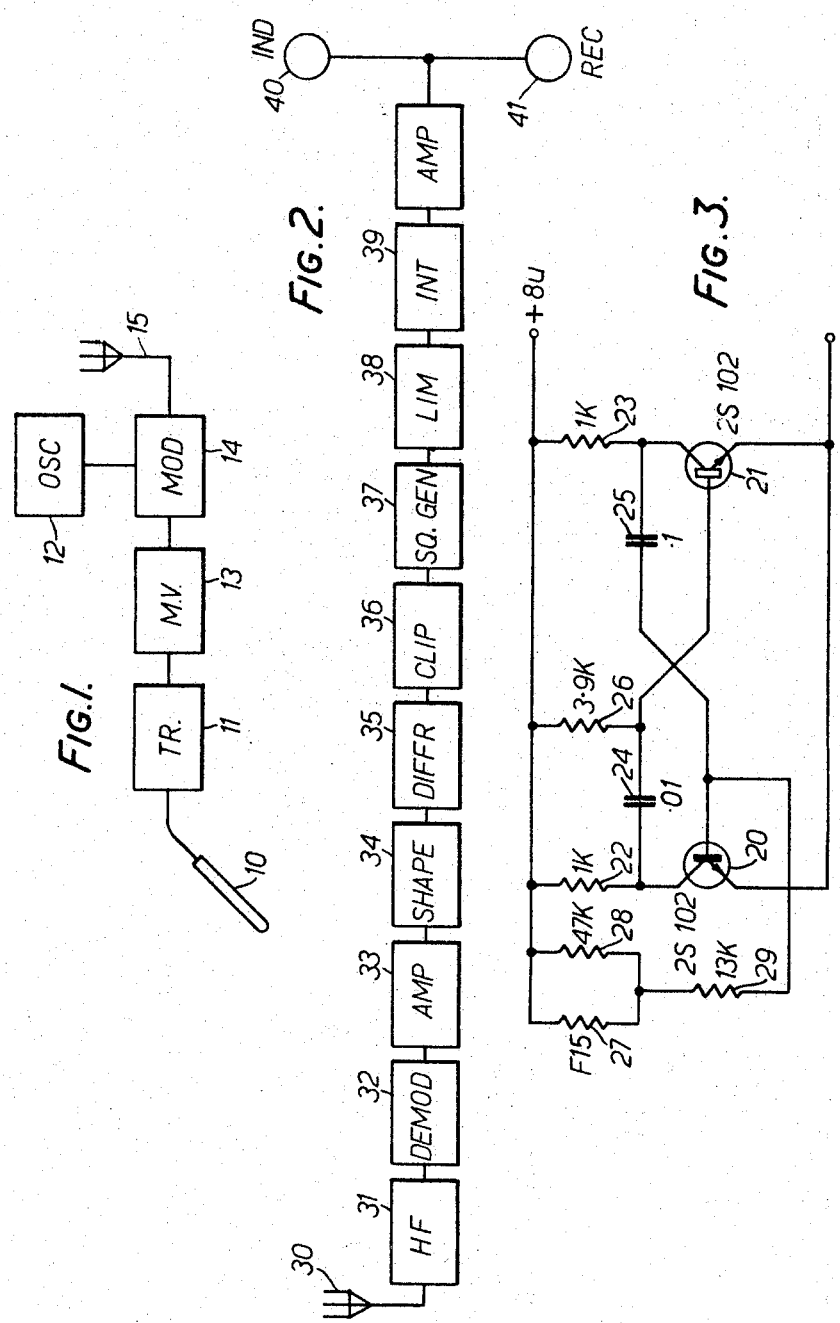

3,333,476
Patented Aug. 1, 1967

3,333,476
TEMPERATURE MEASURING APPARATUS
Donald Hardy, London, and Peter H. Smith, Maidenhead, England, assignors to J. Lyons & Company Limited
Filed Nov. 13, 1963, Ser. No. 323,399
Claims priority, application Great Britain, Nov. 13, 1962, 42,833/62
10 Claims. (Cl. 73—362)

This invention relates to apparatus for monitoring a physical condition, such as temperature. The invention is particularly applicable to giving indication of the temperature of a moving body, or to provide a convenient remote indication of temperature. An apparatus in accordance with the invention is particularly suited to measuring the temperature of articles passing through a baking oven, and embodiment of the invention for this purpose is described hereinafter. However, the invention can be used in other circumstances where similar conditions exist.

The invention also relates to a method of measuring the temperature within an article on a conveyer.

According to one aspect of the invention there is provided an apparatus for monitoring a physical condition prevailing at a position, comprising means to generate an electrical representation of the condition, means to radiate the representation in the form of a modulation signal, means to receive the radiated signal, means to derive a signal dependent on the electrical representation, and means to evaluate the derived signal, thereby to record or indicate the said physical condition at a point remote from the said position.

According to another aspect of the invention, there is provided an apparatus for continuously monitoring the temperature of a moving article, comprising a transmitter apparatus adapted to move with the article and a receiver apparatus for cooperating with the transmitter apparatus to indicate or record the said temperature at a point remote from the article, the transmitter apparatus comprising means to generate an electric wave with a frequency continuously representing the temperature, means to impress the generated wave on a carrier as a modulation, and means to radiate a modulation signal, being the result of impressing the said wave on the said carrier, the receiver apparatus comprising means to receive the signal, means to derive therefrom a signal dependent on the said temperature-representing frequency, and means to evaluate the derived signal, thereby to record or indicate the temperature.

In the embodiment of the invention to be described, a temperature-sensitive element is used to modulate a radiation device, with information indicative of temperature. The radiated signal can be remotely received and demodulated to produce a demodulation output indicative of temperature.

Other features and advantages of the invention will appear from the following description of this embodiment thereof, given by way of example, in conjunction with the accompanying drawings, in which:

FIGURE 1 is a block schematic diagram of a temperature sensitive transmitting unit;

FIGURE 2 is a block schematic diagram of a receiving apparatus for use with the transmitter of FIGURE 1; and FIGURE 3 is a fragmentary circuit diagram of part of the transmitter of FIGURE 1.

This embodiment of the invention is intended for use in indicating the temperature of articles, such as cakes and the like, being baked in a conveyor type oven. The apparatus comprises two main units, of which one is entirely self-contained, and moves on the conveyor, through the oven. It includes a probe or the like which can be inserted in a cake, and it transmits a signal which is indicative of the probe temperature. This part of the apparatus is indicated diagrammatically in FIGURE 1. A probe 10 forms part of a transducer 11, and the transducer is used to impress a modulation upon oscillations from a generator 12. In the form of the invention being described, the transducer is coupled to a multivibrator 13, the frequency of which is varied in accordance with the temperature of the probe 10. The multivibrator output, and the output of generator 12, are both applied to a modulator 14 with, if necessary, a power amplifier, to transmit a modulated signal from aerial 15. It is convenient if the radiated signal is a radio wave, though this is not essential.

While various forms of apparatus can be used for probe 10 and transducer 11, in conjunction with multivibrator 13, a convenient and simple arrangement is shown in simplified circuit form in FIGURE 3. This comprises two transistors 20, 21 preferably of the silicon type, arranged in a multivibrator circuit, including collector load resistors 22, 23, and coupling capacitors 24, 25. The base of the transistor 21 is biased by resistor 26, but the bias of the transistor 20 is determined by means which include a thermistor 27. As shown, thermistor 27 is shunted by a resistor 28, and the parallel combination is in series with a further resistor 29. The thermistor 27 is the sensitive element provided at the end of the probe indicated diagrammatically at 10 in FIGURE 1.

With the circuit of FIGURE 3, normal multivibrator action will take place to produce a square wave output, the frequency of which is determined by the circuit constants; with the values marked on FIGURE 2, the frequency will be of the order of 5 kc./s. However, since the thermistor forms part of the feed back circuit, the frequency of the square wave output will be a function of the temperature of the thermistor. The circuit components can be varied in accordance with the thermistor used and the desired range of temperature indication, but the figures given are suitable for temperatures in the region of 90° to 150° F.

The frequency of oscillator 12 can be of any suitable value provided it is above the multivibrator frequency, but in practice a frequency of the order of 5 mc./s. is suitable; also, any form of modulation can be used in the modulator 14.

The parts shown in FIGURE 1 are arranged as a self-contained unit, together with any energizing batteries; for this reason it is highly suitable that the generator 12 and the modulator 14 should also be transistor operated. The parts can be arranged in a suitable encasing, such as a glass tube, with the aerial 15 emerging from one end. Since the temperature of a baking oven will normally be above the maximum operating temperature of any normally available transistors, the unit is encased firstly in a heat insulating material such as fibre glass, and then surrounded by a further enclosure comprising fibre glass and solid carbon dioxide. With a suitable outer enclosure, this unit can withstand the temperature of the oven, for a period such as would normally be employed for baking confectionary, without the temperature rise of the equipment being beyond the permissible figure.

At a point suitably remote from the oven, a receiving apparatus is set up, for the purpose of demodulating the radiated signal, and providing a suitable indicating or recording means. A suitable arrangement for this purpose is shown in block schematic form in FIGURE 2. A receiving aerial 30 feeds signal circuit 31, of conventional form, and a demodulator 32. The demodulated output is applied to an amplifier 33 and at this point will consist of a square wave output approximating the waveform of the output of multivibrator 13, but with the wave shape somewhat degraded by reason of the radio transmission. Accordingly the demodulation signal is applied to a shaper 34, the effect of which is to sharpen both the leading and trailing edges of the square waves, after which the shaped wave is applied to a differentiating circuit 35. The output of this stage will consist of a series of alternately positive and negative going pulses the period of which is also related to the frequency of multivibrator 13.

The pulses are applied to a clipping circuit 36, which removes the negative pulses, and the positive pulses are applied to a square wave generating circuit 37. This stage is of the kind where an input pulse is required to produce each transition from the "on" to the "off" state of the generator. With such an arrangement it will be seen that the generator 37 will in fact produce a square wave train having half the frequency of multivibrator 13, but of which the mark-space ratio will be unity, since each transition is determined by a leading pulse of the multivibrator output.

The square wave output of generator 37 is applied to an amplitude limiter 38 and then to an integrator 39; the integrated output of stage 39 will accordingly be a signal denoting the area of individual square waves as they are incident, which is a function of multivibrator frequency 13, and also of the temperature of the probe 10. The output of integrator 39 can be applied, via an amplifier if desired, to an indicator 40 or a recorder 41, or as shown to both.

In this way it has been found possible to produce a temperature-sensitive apparatus which will give a rapid indication of changes of temperature of the interior of a cake or other article of confectionery that is being cooked, and the information thereby obtained is more revealing than that which can be ascertained by normal temperature measuring apparatus.

The apparatus may be sensitive to a physical condition other than temperature, such as pressure, humidity or the like, by suitable choice of the element 10.

We claim:

1. An apparatus for monitoring a physical condition prevailing at a position, comprising means to generate an electrical representation of the condition, means to radiate the representation in the form of a modulation signal, means to receive the radiated signal, means to derive a signal dependent on the electrical representation, said means to derive comprising means to detect the modulation on the receiving signal, means to shape the detected signal whereby a square wave with sharp leading edges is delivered, means to differentiate the delivered square wave, clipping means to provide pulses corresponding to the said leading edges, bistable means responsive to the pulses to change between the two states as each pulse is incident thereby to generate a square wave of unity mark-space ratio and frequency one half of the detected square wave and means to limit the amplitude of the square wave train, and means to evaluate the derived signal, thereby to record or indicate the said physical condition at a point remote from the said position, said last named means including means to deliver an output, which is continuously denotive of the integrated areas of the individual square waves in said square wave train, to an indicator.

2. An apparatus for continuously monitoring the temperature of a moving article, comprising a transmitter apparatus adapted to move with the article and a receiver apparatus for co-operating with the transmitter apparatus to indicate or record the said temperature at a point remote from the article, the transmitter apparatus comprising means to generate an electric wave with a frequency continuously representing the temperature, said means to generate including a thermistor at the end of a probe for insertion within the article, and a transistorized multivibrator oscillator circuit having a frequency-determining resistance path to which the thermistor is coupled, the multivibrator output being a square wave, means to impress the generated wave on a carrier as a modulation, and means to radiate a modulation signal, being the result of impressing the said wave on the said carrier, the receiver apparatus comprising means to receive the signal, means to derive therefrom a signal dependent on the said temperature-representing frequency, and means to evaluate the derived signal, thereby to record or indicate the temperature.

3. An apparatus according to claim 1, having an amplifier to present the delivered output to the indicator or recorder.

4. A method of monitoring a physical condition in the control of a manufacture wherein an article is conveyed during the manufacture, comprising the steps of inserting an electrical component sensitive to the condition within the article to a required depth, arranging a multivibrator unit, carrier wave generator and radiator to move along with the article, coupling the component to control the output frequency of the multivibrator unit, impressing the multivibrator output on the generated carrier wave, radiating a modulation signal resulting from the said impressing, receiving the radiated signal at a fixed point, deriving from the radiated signal a signal dependent on the multivibrator output frequency, by shaping the leading edges of the square waves originating from the multivibrator output, operating on the shaped signals with a binary divider unit whereby a square wave train with a unity mark-space ratio is obtained and limiting the amplitude of the square wave train, evaluating the derived signal and registering the derived signal by registering the area of individual incident square waves in the train to give an indication or record of their frequency, thereby to indicate or record the condition.

5. An apparatus for continuously monitoring the temperature of an article moving through a conveyor type oven, comprising a radio transmitter apparatus adapted to move with the article through said oven and a receiver apparatus for co-operating with the transmitter apparatus to generate a signal for indicating the said temperature at a point remote from the article, the transmitter apparatus comprising a probe adapted to be inserted into said article to sense the temperature at a point within said article, and generating means responsive to said probe for generating and transmitting a signal, said generating means comprising means for modulating a carrier frequency with a train of pulses forming a square wave, the repetition rate of the pulses of said train being a function of said temperature, and a power supply for said generating means, said receiver apparatus being responsive to the pulse repetition rate of said component of the transmitted signal.

6. An apparatus according to claim 5, wherein said generating means includes means for generating a carrier signal, a thermistor at the end of said probe for insertion within the article, a transistorized multivibrator having a frequency-determining resistance path to which the thermistor is coupled, and modulation means responsive to the output of said multivibrator to modulate said carrier signal.

7. An apparatus according to claim 6, wherein the receiver apparatus comprises means for detecting the pulse component of the transmitted signal, means for shaping the detected signal to produce a square wave with sharp leading edges, means for differentiating said square wave and clipping the differentiated signal to provide pulses corresponding to the said leading edges, bistable means responsive to the differentiated and clipped signal to generate a pulse train of substantially unity mark-space ratio and of repetition rate one half of the detected square wave, and integrating means for integrating the output of said bistable means.

8. An apparatus according to claim 7, wherein the receiver apparatus includes an amplifier responsive to the output of said integrating means for connection to an indicating device.

9. Apparatus according to claim 5, including enclosure means for enclosing at least the components of said transmitter which are vulnerable to high temperatures and thermally insulating them from the external atmosphere.

10. Apparatus according to claim 9, wherein said enclosure means includes means interposed between said components and the external atmosphere for receiving a cooling medium such as solid carbon dioxide.

References Cited

UNITED STATES PATENTS

| | | | |
|---|---|---|---|
| 2,283,919 | 5/1942 | Diamond et al. | 73—170 |
| 2,618,976 | 11/1952 | Andresen | 73—170 |
| 2,696,115 | 12/1954 | Gretz | 73—343 |
| 2,984,729 | 5/1961 | Hykes et al. | 331—113 XR |
| 3,136,952 | 6/1964 | Hamby et al. | 331—145 XR |
| 3,146,408 | 8/1964 | Nissim et al. | 331—113 XR |
| 3,158,027 | 11/1964 | Kibler | 73—362 |
| 3,176,229 | 3/1965 | Pierce | 331—113 XR |
| 3,231,877 | 1/1966 | Marlot | 390—206 |

DAVID SCHONBERG, *Primary Examiner.*

LOUIS R. PRINCE, *Examiner.*

D. McGIEHAN, N. B. SIEGEL, *Assistant Examiners.*